United States Patent [19]

Kimura et al.

[11] 3,908,027

[45] Sept. 23, 1975

[54] JELLY-LIKE FOODS

[75] Inventors: Hiroshi Kimura, Kyoto; Kensuke Kusakabe, Osaka; Shigehiko Sato, Tokyo; Hiromi Nakatani, Kyoto, all of Japan

[73] Assignee: Takeda Chemical Industries, Ltd., Osaka, Japan

[22] Filed: Mar. 4, 1974

[21] Appl. No.: 448,048

Related U.S. Application Data

[63] Continuation of Ser. No. 200,577, Nov. 19, 1971, abandoned.

[30] Foreign Application Priority Data

Nov. 21, 1970 Japan............................. 45-103090

[52] U.S. Cl.................................. 426/578; 426/573
[51] Int. Cl.$^2$............................................. A23L 1/04
[58] Field of Search ............ 426/167, 168, 169, 350

[56] References Cited
UNITED STATES PATENTS 2,191,352  2/1940  Oprean ................................. 426/91
2,403,547  7/1946  Peschardt .......................... 426/169
3,493,383  2/1970  Ryan et al.......................... 426/167

OTHER PUBLICATIONS

"Production of a Firm Resilient Gel–Forming Polysaccharide by a Mutant of Alcaligenes faecalis myxogenes 10c3," Agr. Biol. Chem. Vol. 30, No. 2, 196–198, 1966.

*Primary Examiner*—Louis A. Monacell
*Assistant Examiner*—J. M. Hunter
*Attorney, Agent, or Firm*—Wenderoth, Lind & Ponack

[57] ABSTRACT

The present invention relates to jelly-like foods with an elastic skin accounting for 55–88 percent of the total weight with a pasty or liquid core which contains 1.5 to 6 wt/vol% of a polysaccharide which is thermally gelable in a concentration not lower than 1 percent (weight/volume) suspension, and mainly consists of $\beta$-1,3-pyranoglucose units and which have a bulk accomodated in the space of a cube 5–30 millimeters on edge. The present invention also relates to a method of producing the above-jelly-like foods.

4 Claims, No Drawings

JELLY-LIKE FOODS

This is a continuation application of application Ser. No. 200,577, filed Nov. 19, 1971, now abandoned.

This invention relates to jelly-like foods which have an elastic gel skin and a method for producing them.

The term jelly-like foods' as used throughout this specification as well as claims means the foods whose skin or shell is composed of an elastic transparent or opaque gel and whose core is either composed of a liquid or paste, such as the juicy pulp of a grape, or a void as will be formed upon removal of the above liquid core. Examplary jelly foods include fruit jellies and milk jellies of the above structure, as well as a sherbet contained in a shell of jelly.

Heretofore, such gelling agents as gelatin, pectin, agar, etc. have been generally used in commercial jelly-like foods, and those gelling agents are characterized in that, if dissolved in water under heating and, then cooled, they form gels. Those gels are generally homogeneous, with their firmness and elasticity being uniform throughout. There are, however, certain serious disadvantages. Gelatin, for instance, must be dealt with at somewhat low temperatures, for gelatin gel has a relatively low melting point. At high temperature, e.g. under boiling conditions, gelatin is thermally denatured so that the important property of gelability is lost. In addition, gelatin hardly gels when an acidic substance such as fruit juice is added.

In case of employing pectin, it is necessary to add fruit juices, sugar, etc. in such proportions as will provide a suitable pectin-sugar-acid ratio. Agar is disadvantageous in that it does not gel under acidic conditions. Thus, the conventional gelling agents including gelatin, pectin and agar have various disadvantages which detract from their applicability. In addition, those gelling agents gel uniformly throughout so that, with those agents, it is extremely difficult to accomplish the object of this invention effectively and positively. In line with the recent change in dietary habits, the demand for jelly-like foods has remarkably expanded and, moreover, a trend toward upgrading is noted. Under those circumstances, the present inventors conducted an extensive study and have found that a certain polysaccharides which are thermally gelable in a concentration of not lower than 1 percent (weight/volume) take the place of the above-mentioned gelling agents, and are favorably applicable to jelly-like foods having an elastic gel skin. The present invention is a culmination of the above findings.

Thus, the present invention relates to jelly-like foods with an elastic skin accounting for 55 to 88 percent of the total weight and with a pasty or liquid core; the foods essentially contain a 1.5 to 6 (weight/volume) % of a polysaccharide which is thermally gelable in a concentration of not lower than 1% (weight/volume) suspension and mainly consists of $\beta$-1,3-pyranoglucose units; and the foods have a bulk accomodated in the space of a cube 5 to 30 millimeters on edge; and the production thereof.

Production of Polysaccharide

The thermally gelable polysaccharides mentioned above can be obtained, for instance, by cultivating a microoganism belonging to the genus *Alcaligenes* or *Agrobacterium* in a medium containing glucose as a carbon source, and are recovered therefrom as a white or off-white powder in a dehydrated and dried form. Glucose is the main constituent sugar of the polysaccharide, and, in infrared analysis, the powders exhibit properties characteristic of a polysaccharide and have an absorption characteristic of $\beta$-linkage at 890 cm$^{-1}$. In addition, the polysaccharides exhibit very unique behaviors.

Thus, they swell and gel when poured in water and heated. For example, when suspended in water to a concentration of about 1 percent and heated, these polysaccharides form a gel which is thermally irreversible and not suspended upon the addition of water. The gel strength of the polysaccharides is between 470 × 10$^3$ to 1,300 × 10$^3$ dyne/cm$^2$ when measured under the following conditions: A 2.0 g. sample is made up with pure water to 100 ml. and homogenized by means of a mixer for 5 minutes. The resulting suspension is transferred to a test tube of 15 mm, in diameter, which is degased to remove bubbles under a reduced pressure of not higher than 10 mmHg, followed by heating in a boiling water bath for 10 minutes. Then, it is cooled with a cold water for 10 minutes and allowed to stand at room temperature for 30 minutes. The gel is taken out from the tube and cut into 1.0 cm thick disc, with the uppermost layer being discarded. The pressure resistance of the gel disc against the cylinder (5.6 mm. in diameter) of curd-tension meter just before the cylinder breaks into the disc is measured and recorded in terms of a dyne scale. The resistance value recorded is taken as the gel strength of the specimen.

The microorganisms of the genus *Alcaligenes* which are capable of producing the indicated polysaccharides include, for example, *Alcaligenes faecalis var myxogenes* NTK-u (ATCC 21680), a mutant strain which is obtained upon treatment of parent strain K with N-methyl-N-nitro-N-nitro-soguanidine, (a strain capable of producing polysaccharide "PS-B") and *Alcaligenes faeculis var myxogenes K* (a strain capable of producing polysaccharide "Curdlan." See Agricultural Biological Chemistry, vol 30, pages 196 et seq. (1966) by Harada et al.). The pertinent microorganisms of the genus *Agrobacterium* include such strains as ATCC 21679 and IFO 13127 which have been identified as *Agrobacterium radiobacter* and capable of producing polysaccharide PS-A. "IFO" denotes the deposit number at the Institute for Fermentation, Osaka, Japan.

For the production of objective polysaccharides, these microorganisms are incubated in a medium which contains assimilable carbon sources (e.g. glucose, sucrose, sorbitol, dextrin, starch hydrolyzates, organic acids) digestible nitrogen sources (e.g. inorganic ammonium salts, nitrates, organic nitrogen sources such as yeast extract, corn steep liquor, corn gluten, soy bean meal) inorganic salts (e.g. salts of manganese, iron, magnesium, calcium, zinc, cobalt). If desired, such trace growth promoters as vitaminaceous materials, nucleic acid-related compounds and so forth may be incorporated in the culture medium. In case of cultivation of said strain NTK-u, it is necessary to incorporate 50 to 1,000 mcg/ml of uracil in the medium.

Although the preferred cultural conditions vary with different microorganisms employed, cultivation of the main culture for the production of said polysaccharides is generally effected at pH about 5 to 8 at a temperature of 20° to 35°C for 2 to 4 days, using such cultivation means as shake culture or submerged culture.

As the polysaccharides thus produced usually occur predominantly extracellularly, advantage may be taken, in order to recover them, of a combination of techniques which are per se known means for separation and purification of polysaccharides. By way of illustration, there may be employed such techniques as dissolution, filtration, precipitation (e.g. by neutralization, salting out or the like), desalting (e.g. by permselective dialysis, reverse deionization or the like), liquid-solid separation (e.g. by compression, centrifugation or the like), drying (e.g. by spray drying, lyophilization or the like), powdering etc.

Some examples for the production of polysaccharides are shown below.

EXAMPLE A-1

A loopful of a slant culture of *Agrobacterium radiobacter* (IFO-13127) is inoculated in 30 ml. of an aqueous culture medium charged in a 200 ml.-flask, the medium being composed of glucose (5%), $(NH_4)_2HPO_4$ (0.1%), yeast extract (0.5%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCl_2$ (0.001%) and water and being adjusted at pH 7.2. Cultivation is effected under shaking at 28°C for 4 days.

The resulting viscous broth is centrifuged at 10,000 rpm. for 20 minutes to separate a sediment from a supernatant liquid. To the sediment is added an aqueous 0.5N-NaOH solution, followed by thorough stirring to completely dissolve the polysaccharide portion of the sediment. The solution is then centrifuged again at 10,000 rpm. for 20 minutes to remove the cells. The solution is neutralized with a 12% aqueous HCl solution, whereupon the desired polysaccharide separates out as a gel. This gel fraction is collected by centrifugation at 2,000 rpm. for 10 minutes, and washed twice or three times with water, followed by dehydration with acetone and drying, to give 420 mg. of PS-A.

On the other hand, to the supernatant obtained by centrifugation of the culture broth is added its 4-fold volume of acetone. The resulting precipitates are collected and dried to give 120 mg. of polysaccharide PS-A Specific rotation:
 $-17° ± 3°$ (C = 1.0, dimethylsulfoxide)
 $+33° ± 6°$ (C = 1.0, 0.1N—NaOH)
Elementary analysis (%):
 Calculated for $C_6H_{10}O_5$: C=44.44; H=6.17.
 Found: C=43.28 ± 1%; H=6.20 ± 0.5; N=0.00.
gel strength: $650 \times 10^3$ to $1,300 \times 10^3$ dyne/cm²

EXAMPLE A-2

*Alcaligenes faecalis var. myxogenes* Strain NTK-u (ATCC 21680) is inoculated in 30 ml. of a seed culture medium charged in a 200 ml.-Erlenmyer flask, the medium being composed of glucose (1.0%), $(NH_4)_2HPO_4$ (0.15%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCl_2$ (0.001%), yeast extract (0.1%), $CaCO_3$ (0.3%), uracil (0.01%) and water and being adjusted at pH 7.0. Cultivation is effected under shaking at 32°C for 24 hours.

A 2 ml.-portion of the resultant seed culture broth is inoculated in 20 ml. of a main culture medium charged in a 200 ml.-creased Erlenmyer flask, the medium being composed of glucose (10.0%), $(NH_4)_2HPO_4$ (0.23%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCl_2$ (0.001%), $CaCo_3$ (0.3%), uracil (0.01%) and water and being adjusted at pH 7.0. Cultivation is carried out under shaking at 32°C for 90 hours.

The broths thus obtained in several such flasks are pooled. To 80 ml. of the broth is added 240 ml. of an aqueous 0.5N-NaOH solution, followed by thorough stirring until the produced polysaccharide is dissolved. To the mixture is added 160 ml. of water. The diluted solution is centrifuged at 12,000 rpm. for 10 minutes to remove the solid matters including the cells. The supernatant liquid is neutralized with a 3N-HCl, whereupon gel sediments separate. The sediments are collected by centrifugation and washed with water until the salts contained therein are removed. Then, the sediments are again centrifuged to collect the desired polysaccharide PS-B. Dehydration with acetone and drying under reduced pressure yield 4.4 g. of PS-B. The yield relative to the substrate glucose is 55 percent.

Specific rotation:
 $-16°±3°$ (C=0.5, dimethylsulfoxide)
 $+31°±6°$ (C=1.0, 0.1N—NaOH)
Elementary analysis (%):
 Calculated for $C_6H_{10}O_5$: C=44.44; H=6.17.
 Found: C=43.58±1; H=6.46±0.5; N=0.00
gel strength: $650 \times 10^3$ to $1,300 \times 10^3$ dyne/cm²

EXAMPLE A-3

*Alcaligenes faecalis var. myxogenes* K is cultivated in the same manner as in Example A-1 and the resulting broth is centrifuged. To thus obtained sediment is added an aqueous 0.5N—NaOH solution to dissolve the polysaccharide portion of the sediment. The solution is neutralized, whereupon the polysaccharide "curdlan" separates out.

Specific rotation:
 $-18°$ (0.1N NaOH)
Elementary analysis (%):
 C 43.55; H 6.05; O 48.39; N and other minor components 2.01
gel strength: $470 \times 10^3$ to $500 \times 10^3$ dyne/cm²

The gel strength in Examples A-1 to A-3 was measured as mentioned before.

Conditions for the production of jelly-like foods

In the present invention, said polysaccharides are diluted or dispersed and suspended to a concentration of 1.5 to 6 percent. (weight/volume). In this connection, it should be borne in mind that when the concentration is either less than 1.5 or above 6 percent, the object of this invention cannot be accomplished effectively and positively (See Experiment 5). These polysaccharides suspensions are convenient, for there is no need to pay much attention to pH. Thus, since the gelling property of the polysaccharides are available over an unusually wide pH range, i.e. between pH about 2.0 and pH about 9.5, it can be utilized with little trouble for ordinary food processing purposes. In the method of this invention, it is generally convenient to dilute or disperse and suspend the polysaccharides with water, but depending upon cases, it is possible to use water-containing alcohol or propylene glycol. It is also possible to cause the polysaccharides to gel after adding thereto additives as, for example, natural sweetners such as sucrose, glucose fructose, etc; artificial sweetenings such as saccharin; sour agents such as citric acid, malic acid, ascorbic acid, etc.; suitable spices; condiments; and other natural matters and food additives such as sorbitor, dextrin, millet jelly, milk, fermented milk, vitamins, starch, alcoholic beverages, natural fruit juices and the like.

The above mentioned suspensions are then maintained in a mold accomodated in the space of a cube 5 to 30 millimeters on edge, when it is to be coagulated into a sphere, in a mold having a diameter of 5 to 30 millimeters. In this connection, a suitable shape, such as a sphere, ellipsoid, cube, strawberry-like shape or tomato-like shape, may be chosen. In any event, what is necessary is to maintain the polysaccharides in a molding vessel which allows the polysaccharides to be kept in the space of a cube 5 to 30 millimeters on edge.

With regard to molding vessel in which the polysaccharides are to be maintained, vessels made of various materials, such as metals (e.g. gun metal, aluminum, etc.), plastics, glass and rubber, may be effectively utilized. It should be noticed, however, that, as will be seen from Experiment 2, even when vessels of a given size are employed, the proper heating time varies with different vessel materials. As to the mode of heating, any heating method can be employed, only if it enables the entire molding vessel to be externally uniformly heated. For example, the vessel may be directly heated in a boiling water bath or indirectly heated by means of an oven, or the like. It should also be understood that, as will be seen from the experimental data given hereinafter, the object of the invention cannot effectively be accomplished when, for instance, the diameter of a spherical food is either less than 5 millimeters or larger than 30 millimeters. The object of the invention will not be effectively accomplished, either, if the heating temperature is either lower than 60°C or higher than 120°C.

Thus, the material of the molding vessel, the size of the gel, the heating temperature, the composition and concentration of the suspension and other conditions should be sufficiently taken into consideration and, as aforesaid, one should maintain 1.5 to 6 percent suspension of the present polysaccharide in a mold accomodated in the space of a cube 5 to 30 millimeters on edge, then externally heating the mold at 60° to 120°C for about 5 to 300 seconds and finally cooling the same. The above external heating conditions are as such considered to account for the heating conditions inside the vessels in view of experiments 1, 3 and 4 where the same heat conditions, namely, external heating at 60° to 120°C for 5 to 300 seconds, also prove to be proper for the purpose of the present invention. In these experiments the glass vessel is so thin that the heat conductivity and the difference in temperature between inner and outer walls of the vessel are almost negligible. After all, it is desirable to ensure that the gel skin will account for about 55 to 88 percent of the total weight of the product.

Of course, the heating time should be longer when the heating temperature is comparatively low and, conversely, the heating time may be short when the heating temperature is high.

The cooling of the gel may be suitably effected. Thus when the heating time is comparatively long, the gel may be allowed to cool at room temperature.

In the method of this invention, after the preparation of a product having a liquid core, it may be made hollow by removing the internal liquid in a suitable manner and the void thus created may be filled in with a different liquid food.

Since the jelly obtained from the thermally coagulable polysaccharides is intrinsically highly stable against freezing and thawing, it is possible to freeze the jelly thus produced in a routine manner to obtain a quality ice confection contained in an elastic gel skin.

The method of this invention is of considerable commercial value to the industry.

Experiment 1

1. Testing procedure

Five grams of thermally gelable polysaccharide PS-B was suspended in 100 ml. of water, and 5.6 g. of the resulting suspension was filled into spherical glass vessels, 19 millimeters in diameter. The vessels were then heated under the varying conditions set forth in Table 1 and cooled. For each of the samples thus obtained, the gelling ratio was determined. The heating was conducted in a water bath when the heating temperature was 100°C or less; in an oil bath when the temperature was 110°C or higher. It was so arranged that the vessels were externally evenly heated. The gelling ratio is the weight ratio of the gelled portion of each sample to the unheated suspension used for the preparation of the sample. When the ratio corresponds to about 55 to 88 weight percent, the product is a jelly-like food suitable for the present purposes. Such a product has an elastic gel skin and a liquid or pasty core.

2. Results

The results of the test are set forth in Table 1. It will be seen that when the heating temperature is 59°C or less, the polysaccharide does not gel at all but merely forms a slurry. Conversely, at temperatures above 120°C, even if the suspension is previously sufficiently defoamed, the gel inevitably foams. Therefore, those conditions cannot be adopted in any event.

Thus, heating temperatures suitable for the present purposes are limited to the range of 60° to 120°C, since as aforesaid, the proper gelling ratio for the present purposes is about 55 to 88 percent, suitable conditions are about 140 to 180 seconds at 60°C; about 60 to 100 seconds at 70°C; about 40 to 80 seconds at 80°C; about 40 to 60 seconds at 90°C; about 10 to 40 seconds at 100°C; about 10 seconds at 110°C and about 5 to 10 seconds at 120°C.

| Heating Time (seconds) | Heating Temperature (°C) | | | | | | |
|---|---|---|---|---|---|---|---|
| | 60 | 70 | 80 | 90 | 100 | 110* | 120* |
| 5 | 0 | 0 | 0 | 12.4 | 32.4 | 41.6 | 59.4 |
| 10 | 0 | 0 | 10.4 | 24.8 | 58.3 | 63.4 | 73.8 |
| 20 | 0 | 25.0 | 34.8 | 43.3 | 70.1 | 90.1 | 100 |

Table — Continued

| Heating Time (seconds) | Heating Temperature (°C) | | | | | |
|---|---|---|---|---|---|---|
| | 60 | 70 | 80 | 90 | 100 | 110* | 120* |
| 40 | 0 | 46.4 | 60.7 | 69.7 | 88.5 | 100 | |
| 60 | 11.5 | 64.3 | 75.0 | 80.4 | 100 | | |
| 80 | 25.0 | 76.8 | 87.4 | 94.5 | | | |
| 100 | 34.0 | 85.7 | 92.6 | 100 | | | |
| 120 | 46.4 | 97.6 | 100 | | | | |
| 140 | 66.2 | 100 | | | | | |
| 160 | 76.9 | | | | | | |
| 180 | 89.0 | | | | | | |
| 200 | 99.1 | | | | | | |
| 220 | 100 | | | | | | |
| 240 | 100 | | | | | | |

Note: *An oil bath was used.

Experiment 2

1. Testing procedure

Four grams of thermally gelable polysaccharide PS-B was evenly suspended in 100 ml. of water and the resulting suspension was filled into spherical molds of the varied materials indicated in Table 2. Those samples were heated in an steam kettle at about 100°C and cooled. The heating times required to obtain satisfactory products which was a gel ratio of about 55 to 88 weight % and have an elastic gel skin and a liquid or pasty core were noted.

2. Test results

The test results are set forth in Table 2. It will be seen that there are different suitable heating times for different vessel materials even if the vessels are of the same size. Incidentally, a heating time of 270 to 320 seconds was required in the case of a molding vessel of rubber, 30 millimeters in diameter.

Table 2

| No. | Shape of molding vessel (Spherical) | | Suitable heating time (in seconds) |
|---|---|---|---|
| | Material | Diameter (mm) | |
| 1 | Gun metal | 19 | 40 – 55 |
| 2 | Aluminum | 19 | 10 – 15 |
| 3 | Glass | 19 | 25 – 40 |
| 4 | Plastic | 19 | 230 – 280 |
| 5 | Rubber(bladder) | 30 | 170 – 320 |

Note: The 'plastic' used above is a heat-resistant resin.

Experiment 3

1. Testing procedure

A 6% aqueous suspension of thermally gelable polysaccharide PS-B was previously prepared and filled into glass molding vessels which would give spherical jelly products of the sizes indicated in Table 3. The vessels were heated in a steam kettle at 95° to 100°C and cooled.

The heating times were investigated which are suitable for the production of satisfactory products which feature a gelling ratio of about 55–88 weight % and which have an elastic gel skin and a pasty core.

2. Test results

The results of the above test are set forth in Table 3. It is evident that, in the case of spherical jelly products, suitable heating times increase as the products gain in volume. It is also clear that when the diameter of products is less than 5 millimeters, it is technically difficult to accomplish the object of this invention and that, conversely, if the diameter is greater than 30 millimeters, the resulting gel will tend to collapse. Thus, the proper range is 5 to 30 millimeters.

Table 3

| No. | Diameter of jelly product (m.m) | Suitable heating time (in seconds) |
|---|---|---|
| 1 | 3 | Technically difficult |
| 2 | 5 | 5 – 7 |
| 3 | 10 | 8 – 12 |
| 4 | 19 | 35 – 45 |
| 5 | 25 | 90 – 110 |
| 6 | 30 | 180 – 200 |
| 7 | 36 | 330 – 370 |

Whereas product No. 7 was brittle and improper, products No. 2 to 6 were elastic and proper.

Experiment 4

1. Testing procedure

This experiment was carried out in the same conditions as in Experiment 1 except for the diameter of the glass vessels being 30 millimeters in diameter.

2. Results

Gelling ratio is set forth in Table 4. The heating temperature which accounted for about 55 to 88 percent was about 220 to 300 seconds at 60°C, about 160 to 240 seconds at 70°C, about 140 to 220 seconds at 80°C, about 120 to 200 seconds at 90°C, about 80 to 200 seconds at 100°C, about 40 to 140 seconds at 110°C and about 20 to 100 seconds at 120°C, respectively.

Table 4

| Heating time (seconds) | Heating Temperature (°C) | | | | | | |
|---|---|---|---|---|---|---|---|
| | 50 | 70 | 80 | 90 | 100 | 110 | 120 |
| 20 | 0 | 0 | 18.4 | 24.5 | 42.0 | 53.3 | 62.8 |
| 40 | 0 | 21.9 | 24.5 | 31.3 | 47.1 | 58.6 | 68.0 |

Table 4 – Continued

| Heating time (seconds) | Heating Temperature (°C) | | | | | | |
|---|---|---|---|---|---|---|---|
| | 50 | 70 | 80 | 90 | 100 | 110 | 120 |
| 60 | 0 | 28.1 | 31.3 | 38.9 | 52.6 | 64.3 | 73.1 |
| 80 | 7.6 | 34.5 | 37.6 | 44.7 | 57.3 | 69.7 | 78.3 |
| 100 | 15.3 | 40.9 | 43.9 | 51.7 | 61.8 | 75.3 | 83.6 |
| 120 | 22.9 | 46.7 | 50.0 | 58.5 | 67.4 | 80.8 | 88.8 |
| 140 | 30.4 | 52.5 | 56.8 | 65.2 | 71.6 | 86.9 | 94.5 |
| 160 | 37.7 | 59.1 | 63.2 | 72.1 | 77.2 | 92.1 | 100 |
| 180 | 45.6 | 65.3 | 69.5 | 78.9 | 82.1 | 100 | 100 |
| 200 | 52.8 | 71.5 | 76.0 | 85.7 | 87.5 | 100 | |
| 220 | 60.4 | 77.7 | 82.4 | 92.8 | 100 | | |
| 240 | 68.0 | 83.9 | 89.4 | 100 | | | |
| 260 | 73.1 | 90.6 | 100 | | | | |
| 280 | 78.9 | 100 | | | | | |
| 300 | 84.3 | | | | | | |
| 320 | 93.5 | | | | | | |
| 340 | 100 | | | | | | |

Experiment 5

1. Testing procedures

The indicated thermally gelable polysaccharide was made into 1.5, 3.0, 4.5, 6.0 and 7.5 percent suspensions in water, and those aqueous suspensions were filled into molding vessels of gun metal, 19 millimeters in diameter. The vessels were heated in a steam kettle at 95°–100°C for 50 seconds and cooled to prepare jelly samples, each of which had a gel skin and a liquid or pasty core. A sensory test was conducted by the ranking method using a panel of 20 experts.

2. Test results

The results of the above test are set forth in Table 5. It will be seen that whereas the samples obtained from the 3.0 and 4.5 percent suspensions were superior and most liked, the sample corresponding to the 7.5 percent suspension was significantly disliked at a 1 percent level. Thus, the panelists replied that the 7.5 percent sample was either "coarse," "unpalatable" or "unlike a food." It is therefore considered that the upper concentration limit should be 6 percent. On the other hand, when the concentration is lower than 1.5 percent, the jelly product which has a liquid core cannot retain its shape. Therefore, it is clear that the effective concentration range is from 1.5 to 6 percent.

Table 5

| Sample | 1.5% | 3.0% | 4.5% | 6.0% | 7.5% |
|---|---|---|---|---|---|
| Sum of ranks | 58 | 45 | 48 | 69 | 80** |

Note 1. ** denotes a 1 % level of significance (according to A. Kramer's table)
2. Reference: A. Kramer Food Technology vol. 17 (No. 12), 1596 (1963).

EXAMPLE B-1

Forty-five grams of polysaccharide PS-B, 500 g. of glucose, 5 g. of gum arabic, 10 g. of malic acid, suitable amounts of food color and grape flavor and 500 ml. of water are admixed and homogenized using a homogenizer. The resulting mixture is filled into spherical molding vessels of gun metal, 19 mm in diameter, and externally uniformly heated by steaming at about 100°C for about 60 seconds. Then, the vessels are immediately cooled in running water. The above procedure yields about 1000 g. of jelly balls which have an elastic gel skin and a liquid core. This jelly balls are resistant against 80 g. weight plummet when measured by curd-tension meter.

EXAMPLE B-2

Twenty grams of polysaccharide PS-B, 500 g. of sucrose, 8 g. of citric acid, 2 g. of sodium citrate, suitable amounts of food color and flavor and 650 ml. of water are admixed and homogenized using a homogenizer. The resulting mixture is filled into spherical molding vessels of a plastic material, 20 mm in diameter, and externally uniformly heated by steaming at about 100°C for about 5 minutes. Then, the vessels are immediately cooled in running water. The above procedure yields about 1,100 g. of jelly balls which have an elastic gel skin and a liquid core.

EXAMPLE B-3

Fifty grams of polysaccharide PS-B, 250 ml. of a concentrated fruit juice and 750 ml. of water are evenly blended. The resulting suspension is filled into spherical molding vessels of gun metal, 19 mm in diameter, and externally evenly heated by steaming at about 100°C for about 30 seconds, immediately followed by cooling in running water. The above procedure yields about 1,000 g. of jelly balls which have an elastic gel skin and a liquid core.

EXAMPLE B-4

A suspension prepared in the manner described in Example 3 is maintained in rubber bladders in such a manner that jelly balls, 30 mm in diameter, will be obtained. The bladders are hermetically closed and heated in a boiling water bath for about 280 seconds, immediately followed by cooling in running water. The above procedure yields about 1,000 g. of jelly balls which have an elastic gel skin and a liquid core.

EXAMPLE B-5

Fifty grams of polysaccharide PS-B, 300 g. of sucrose, a suitable amount of vanila flavor and 1000 ml. of milk are admixed and homogenized using a homogenizer. The resulting suspension is filled into spherical molding vessels of gun metal, 19 mm in diameter, and externally heated in a boiling water bath at about 100°C for about 60 seconds, immediately followed by cooling in running water. The procedure yields about 1,200 g. of jelly balls which have an elastic gel skin and a liquid core.

When the above jelly balls are frozen in the routine manner, the internal liquid is frozen to readily provide excellent ice confections having an elastic gel skin.

EXAMPLE B-6

Fifty grams of polysaccharide PS-B, 300 g. of sucrose, 300 ml. of brandy and 500 ml. of water are admixed and homogenized using a homogenizer. The resulting mixture is filled into spherical molding vessels of gun metal, 19 mm in diameter, and externally evenly heated by steaming at about 100°C for about 45 seconds, immediately followed by cooling in running water. The procedure yields about 1100 g. of jelly balls which have an elastic gel skin and a liquid core of brandy.

EXAMPLE B-7

Forty-five grams of polysaccharide PS-A, 500 g. of glucose, 5 g. of gum arabic, 10 g. of malic acid, suitable amounts of food color and grape flavor and 500 ml. of water are admixed and homogenized using a homogenizer.

The resulting mixture is filled into spherical molding vessels of glass, 19 mm in diameter, and externally uniformly heated by steaming at about 100°C for about 100 seconds. Then, the vessels are immediately cooled in running water. The above procedure yields about 1,000 g. of jelly balls which have an elastic gel skin, liquid core and are resistant against 80 g. weight plummet when measured by curd-tension meter.

EXAMPLE B-8

In the same manner as in Example 1, except for polysaccharide employed being curdlan, jelly balls are prepared which are resistant against 50 g. weight plummet when measured by curd-tension meter.

What we claim is:

1. A method for producing jelly-like foods with an elastic gel skin and with a pasty or liquid core, which comprises; maintaining a 1.5 to 6 percent (weight/volume) suspension of a thermally gelable polysaccharide which mainly consists of $\beta$-1,3-pyranoglucose units, in a mold having a volume that could be accommodated in the space of a cube 5 to 30 millimeters on edge; externally heating the mold at a temperature in the range of 60° to 120°C for about 5 to 300 seconds; and cooling the mold.

2. Jelly-like foods with an elastic skin accounting for 55 to 85 percent of the total weight and with a pasty or liquid core; which essentially contains a 1.5 to 6 percent (weight/volume) of a thermally gelable polysaccharide mainly consisting of $\beta$-1,3-pyranoglucose units, and which have a bulk that could be accommodated in the space of a cube 5 to 30 millimeters on edge.

3. A jelly-like food according to claim 2, namely jelly balls with an elastic gel skin and a liquid core.

4. A jelly-like food according to claim 3, said food being in frozen form.

* * * * *